US010116666B2

(12) United States Patent
Arthur, Jr. et al.

(10) Patent No.: US 10,116,666 B2
(45) Date of Patent: Oct. 30, 2018

(54) SECURE DEBUG TRACE MESSAGES FOR PRODUCTION AUTHENTICATED CODE MODULES

(71) Applicant: Intel Corporation, Santa Clara, CA (US)

(72) Inventors: William C. Arthur, Jr., Columbia, SC (US); John K. Pennington, Irmo, SC (US)

(73) Assignee: Intel Corporation, Santa Clara, CA (US)

(*) Notice: Subject to any disclaimer, the term of this patent is extended or adjusted under 35 U.S.C. 154(b) by 4 days.

(21) Appl. No.: 15/424,243

(22) Filed: Feb. 3, 2017

(65) Prior Publication Data
US 2017/0149797 A1 May 25, 2017

Related U.S. Application Data

(62) Division of application No. 13/996,684, filed as application No. PCT/US2011/065145 on Dec. 15, 2011, now Pat. No. 9,596,082.

(51) Int. Cl.
H04L 9/32 (2006.01)
H04L 29/06 (2006.01)
G06F 11/36 (2006.01)
G06F 21/57 (2013.01)

(52) U.S. Cl.
CPC .......... *H04L 63/123* (2013.01); *G06F 11/362* (2013.01); *G06F 21/575* (2013.01); *H04L 9/3247* (2013.01); *H04L 63/0435* (2013.01); *H04L 63/0442* (2013.01); *H04L 63/061* (2013.01)

(58) Field of Classification Search
None
See application file for complete search history.

(56) References Cited

U.S. PATENT DOCUMENTS

| 8,522,322 | B2 | 8/2013 | Wishman |
| 8,725,123 | B2 | 5/2014 | Raleigh et al. |
| 9,202,015 | B2 | 12/2015 | Datta |
| 9,230,116 | B2 | 1/2016 | Datta |
| 9,395,968 | B1* | 7/2016 | Nallagatla ................. G06F 8/61 |

(Continued)

FOREIGN PATENT DOCUMENTS

WO 2013/089739 A1 6/2013

OTHER PUBLICATIONS

Intel® Itanium® Processor Family System Abstraction Layer Specification, Revision 3.4; Document Number: 245359-009; May 2009; pp. 1-146.*

(Continued)

*Primary Examiner* — Farid Homayounmehr
*Assistant Examiner* — Olanrewaju J Bucknor
(74) *Attorney, Agent, or Firm* — Jordan IP Law, LLC

(57) ABSTRACT

Methods of extending capabilities of authenticated code modules (ACM) with minimal increase in code size comprises defining an authenticated code module (ACM) extension module using an entry of a Firmware Interface Table (FIT). The FIT contains a starting address of the ACM extension module that is located outside of a protected boot block. Based on the ACM extension module having been authenticated, the ACM and the ACM extension module may be processed together.

18 Claims, 7 Drawing Sheets

(56) References Cited

U.S. PATENT DOCUMENTS

| | | | |
|---|---|---|---|
| 2003/0126442 A1* | 7/2003 | Glew | G06F 21/52 713/170 |
| 2004/0030876 A1 | 2/2004 | Qureshi et al. | |
| 2004/0049669 A1* | 3/2004 | Schelling | G06F 8/65 713/2 |
| 2005/0268114 A1 | 12/2005 | Thibadeau | |
| 2006/0015749 A1* | 1/2006 | Mittal | G06F 12/1441 713/190 |
| 2006/0224878 A1* | 10/2006 | Datta | G06F 21/575 713/2 |
| 2007/0130345 A1 | 6/2007 | Da Palma et al. | |
| 2007/0162964 A1 | 7/2007 | Wang | |
| 2007/0192611 A1* | 8/2007 | Datta | G06F 21/57 713/176 |
| 2007/0294663 A1* | 12/2007 | McGuire | G06F 8/45 717/108 |
| 2008/0155347 A1 | 6/2008 | Terrell | |
| 2008/0159541 A1* | 7/2008 | Kumar | G06F 21/57 380/278 |
| 2008/0163383 A1* | 7/2008 | Kumar | G06F 21/575 726/29 |
| 2008/0228763 A1* | 9/2008 | Wong | G06F 11/3624 |
| 2008/0282087 A1 | 11/2008 | Stollon et al. | |
| 2009/0089566 A1* | 4/2009 | Natu | G06F 15/16 713/2 |
| 2009/0132666 A1 | 5/2009 | Rahman | |
| 2009/0144482 A1 | 6/2009 | Tankleff | |
| 2009/0254753 A1 | 10/2009 | De Atley et al. | |
| 2009/0327684 A1* | 12/2009 | Zimmer | G06F 21/575 713/2 |
| 2010/0023735 A1 | 1/2010 | Moyer | |
| 2011/0088032 A1 | 4/2011 | Garrett et al. | |
| 2011/0161676 A1 | 6/2011 | Datta et al. | |
| 2013/0067245 A1 | 3/2013 | Horovitz et al. | |

OTHER PUBLICATIONS

International Search Report and Written Opinion for International Patent Application No. PCT/US2011/065145, dated Aug. 24, 2012, 9 pages.

"Intel Trusted Execution Technology (Intel TXT)", Software Development Guide, Measured Launched Environment Developer's Guide, Document No. 315168-008, Mar. 2011, 112 pages.

International Preliminary Report on Patentability for International Patent Application No. PCT/US2011/065145, dated Jun. 26, 2014, 6 pages.

Office Action for U.S. Appl. No. 13/996,684, dated Jul. 22, 2015, 19 pages.

Final Office Action for U.S. Appl. No. 13/996,684, dated Dec. 31, 2015, 12 pages.

Advisory Action for U.S. Appl. No. 13/996,684, dated May 5, 2016, 4 pages.

Office Action for U.S. Appl. No. 13/996,684, dated Jun. 8, 2016, 9 pages.

Notice of Allowance for U.S. Appl. No. 13/996,684, dated Nov. 8, 2016, 13 pages.

* cited by examiner

| Type | Meaning |
|---|---|
| 0x00 | FIT Header entry |
| 0x01 | PAL_B |
| 0x02-0x0E | Reserved |
| 0x0F | PAL_A |
| 0x10-0x7E | OEM-defined |
| 0x7F | Unused |

| Bytes 0-7 | Address 410 |
| Bytes 8-10 | RSVD |
| Byte 11 | Load Method 425 |
| Bytes 12-13 | EXT Type 420 |
| Byte 14 | Bit 8: C_V<br>Bits 0-7: Type 405 |
| Byte 15 | Checksum |

SECURE DEBUG TRACE MESSAGES FOR PRODUCTION AUTHENTICATED CODE MODULES

CROSS-REFERENCE TO RELATED APPLICATIONS

The present application is a divisional of U.S. patent application Ser. No. 13/996,684 filed on Dec. 5, 2013, which claims the benefit of priority to International Patent Application No. PCT/US2011/065145 filed on Dec. 15, 2011.

BACKGROUND

Technical Field

Embodiments generally relate to data authentication. More particularly, embodiments relate to secured debug messages.

Discussion

Authenticated code modules (ACMs) may include information (e.g., internal hardware registers) that manufacturers may prefer not to expose. With the recent demand to have more information released to customers, changes may be necessary to accommodate this demand.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve an apparatus which includes logic to use a public key to encrypt a debug message associated with an authenticated code module, and to output the encrypted debug message.

Embodiments may involve a computer implemented method which includes defining an authenticated code module (ACM) extension module using an entry of a Firmware Interface Table (FIT) that contains a starting address of the ACM extension module. The starting address is to be located outside of a protected boot block. The method further includes extending a capability of an authenticated code module (ACM) by using the ACM extension module.

Embodiments may include a computer readable storage medium having a set of instructions which, if executed by a processor, causes a computer to use a public key to encrypt a debug message associated with an authenticated code module (ACM), and to output the encrypted debug message.

Embodiments may include a computer readable storage medium having a set of instructions which, if executed by a processor, causes a computer to define an authenticated code module (ACM) extension module using an entry of a Firmware Interface Table (FIT) that contain a starting address of the ACM extension module that is located outside of a protected boot block, and to extend a capability of an authenticated code module (ACM) by using the ACM extension module.

Embodiments may include a computer readable storage medium having a set of instructions which, if executed by a processor, causes a computer to enable debugging of an authenticated code module (ACM) using codes that cause information related to an instruction pointer associated with a processor to be presented along with debug messages, and to process the information related to the instruction pointer to determine line number information and file name information associated with a code that includes an instruction used with the instruction pointer.

Figure 1A:
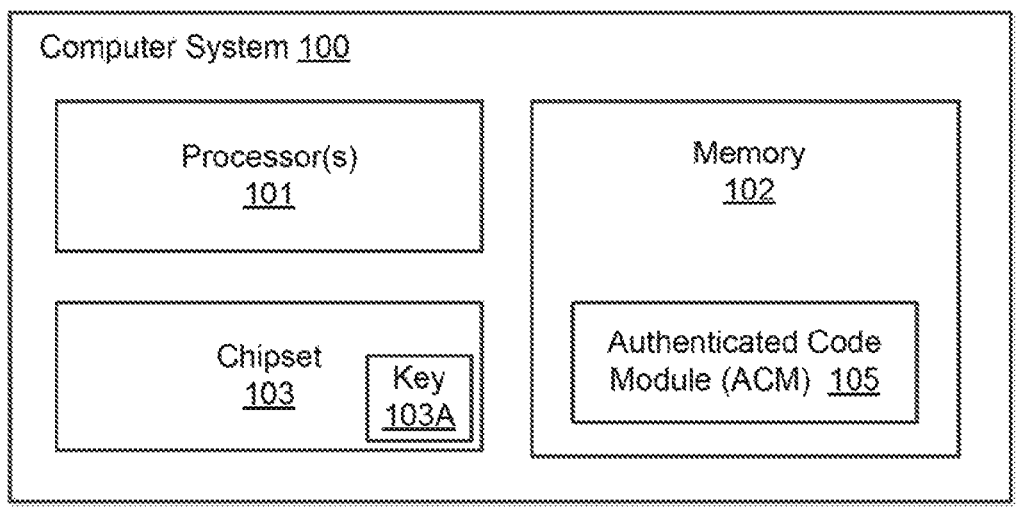
FIG. 1A is a block diagram that illustrates an example computer system having authenticated code modules (ACMs), according to an embodiment.
Figure 1B:
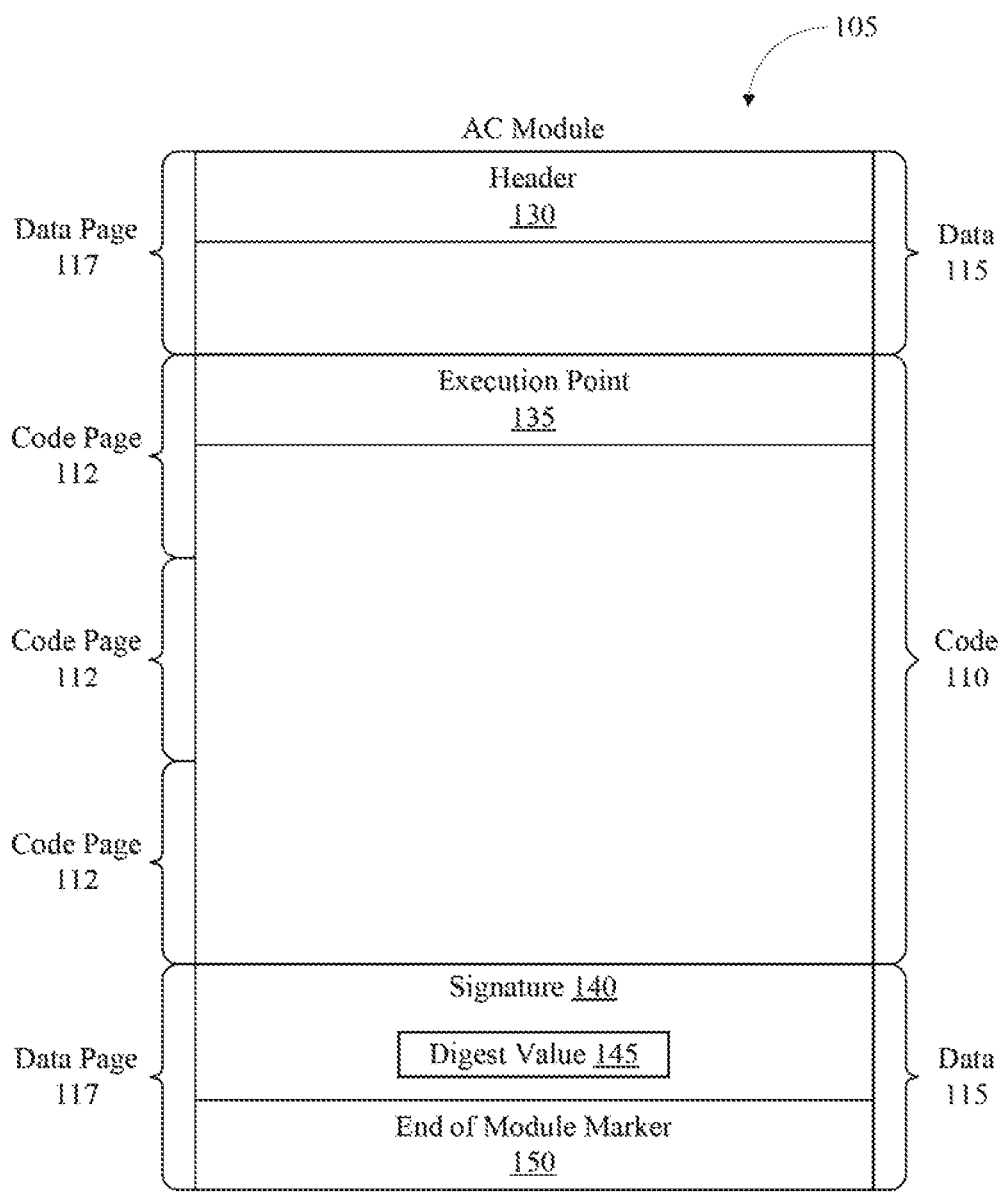
FIG. 1B is a block diagram of an example ACM, according to an embodiment.

FIGS. 1A and 1B illustrate example embodiments of a computer system having one or more ACMs. Computer system 100 illustrated in FIG. 1A may include one or more processors 101 coupled to a chipset 103. The chipset 103 may include one or more integrated circuit packages or chips that couple the processors 101 to memory 102 and/or other I/O devices of the computer system 100. The processors 101 may be implemented as a single integrated circuit, multiple integrated circuits, or hardware with software routines. The processors 101 may support one or more operating modes such as, for example, a real mode, a protected mode, a virtual real mode, and a virtual machine mode (VMX mode). Further, the processors 101 may support one or more privilege levels or rings in each of the supported operating modes. In general, the operating modes and privilege levels of a processor 101 define the instructions available for execution and the effect of executing such instructions. More specifically, a processor 101 may be permitted to execute certain privileged instructions only if the processor 101 is in an appropriate mode and/or privilege level. The processors 101 may include a key 101A such as, for example, a key of a symmetric cryptographic algorithm or of an asymmetric cryptographic algorithm. The processor 101 may use the key 101A to authenticate an ACM 105 prior to executing the ACM 105. The ACM 105 may be a digitally signed code module. The ACM 105 can be signed with production or debug keys. The processors 101 may execute instructions that launch the ACM 105 and instructions that terminate the ACM 105. In addition, the processors 101 may execute instructions to establish a trusted computing environment.

The chipset 103 may include a key 103A that the processor 101 can use to authenticate the ACM 105 prior to execution. Similar to the key 101A of the processor 101, the key 103A may include a key of a symmetric or asymmetric cryptographic algorithm. The chipset 103 may also include trusted platform registers to control and provide status information about trusted platform features of the chipset 103. The memory 102 may store the ACM 105 in a manner that allows the one or more processors 101 to access the ACM 105 and prevents other components of the computer system 100 from altering the ACM 105 or interfering with the execution of the ACM 105. The ACM 105 may be provided in any of a variety of machine readable media which may include any medium that can store, at least temporarily, the ACM 105. This may include physical storage media such as various types of disk and memory storage devices.

As best shown in FIG. 1B, the ACM 105 may include code 110 and data 115. The code 110 may include one or more code pages 112. The data 115 may include one or more data pages 117. The code pages 112 may include processor instructions to be executed by one or more processors 101. The data pages 117 may include data to be accessed by one or more processors 101 in response to executing instructions of the code pages 112.

The ACM 105 may further include one or more headers 130 that may be part of the code 110 or the data 115. The headers 130 may provide information about the ACM 105 such as, for example, module author, copyright notice, module version, module execution point location, module length, authentication method, etc. The ACM 105 may further include a signature 140 which may be a part of the code 110, data 115, and/or headers 130. The signature 140 may provide information about the ACM 105, authentication entity, authentication message, authentication method, and/or digest value.

The ACM 105 may also include an end of module marker 150. The end of module marker 150 specifies the end of the ACM 105 and may be used as an alternative to specifying the length of the ACM 105. For example, the code pages 112 and data pages 117 may be specified in a contiguous manner, and the end of module marker 150 may include a predefined bit pattern that signals the end of the code pages 112 and data pages 117. It should be appreciated that the ACM 105 may specify its length and/or end in a number of different manners. For example, the header 130 may specify the number of bytes or the number of pages that the ACM 105 contains. The ACM 105 may reside in a contiguous region of the memory 102 that may be contiguous in the physical memory space or that may be contiguous in virtual memory space. The locations of the memory 102 that store the ACM 105 may be specified by a starting location and a length and/or end of module marker 150. Alternatively, the ACM 105 may be in the memory 102 in either a physically or a virtually contiguous manner. For example, the ACM 105 may be stored in a data structure such as, for example, a linked list that permits the computing device 100 to store and retrieve the ACM 105 from the memory in a non-contiguous manner.

The one or more processors 101 may support instructions that load the ACM 105 into private memory 102 and initiate execution of the ACM 105 from an execution point 135. The ACM 105 may include code 110 which, when loaded into the memory 102, places the execution point 135 at a location specified one or more operands of a launch instruction. Alternatively, the launch instruction may result in the one or more processors 101 obtaining the location of the execution point 135 from the ACM 105 itself. For example, the code 110, data 115, a header 130, and/or signature 140 may include one or more fields that specify the location of the execution point 135. The one or more processors 101 may support instructions that authenticate the ACM 105 prior to execution. Accordingly, the ACM 105 may include information to support authenticity determinations by the one or more processors 101. For example, the signature 140 may include a digest value 145. The digest value 145 may be generated by passing the ACM 105 through a hashing algorithm or some other algorithm. The signature 140 may also be encrypted to prevent alteration of the digest value 145 via an encryption algorithm. In one example embodiment, the signature 140 may be encrypted with the private key that corresponds to a public key of the processor key 101A, the chipset key 103A, and/or other keys. It should be appreciated that the ACM 105 may be authenticated via other mechanisms. For example, the ACM 105 may utilize different hashing algorithms or different encryption algorithms. Further, the ACM 105 may include information in the code 110, data 115, headers 130, and/or signature 140 that indicate which algorithms were used. The ACM 105 may also be protected by encrypting the entire ACM 105 for decryption via a symmetric or asymmetric key of the processor key 101A, the chipset key 103A, or other keys.

As mentioned above, the ACM 105 may be digitally signed with a production key. In this case, the ACM 105 may also be referred to as a production ACM 105. Conventional production ACMs may not currently produce any debug message capability. One of the reasons that conventional ACMs don't have debug messages is because the messages may expose too much information about the internal operations of the ACMs. However, when the original equipment manufacturers (OEMs) have problems integrating these ACMs, debugging those problems can be very difficult and costly.

Embodiments described herein therefore enable securely outputting debug messages so that minimal information may be revealed about the internal operations of the ACM. For some embodiments, the debug messages associated with the ACM 105 may be encrypted using a private key.

Figure 2:
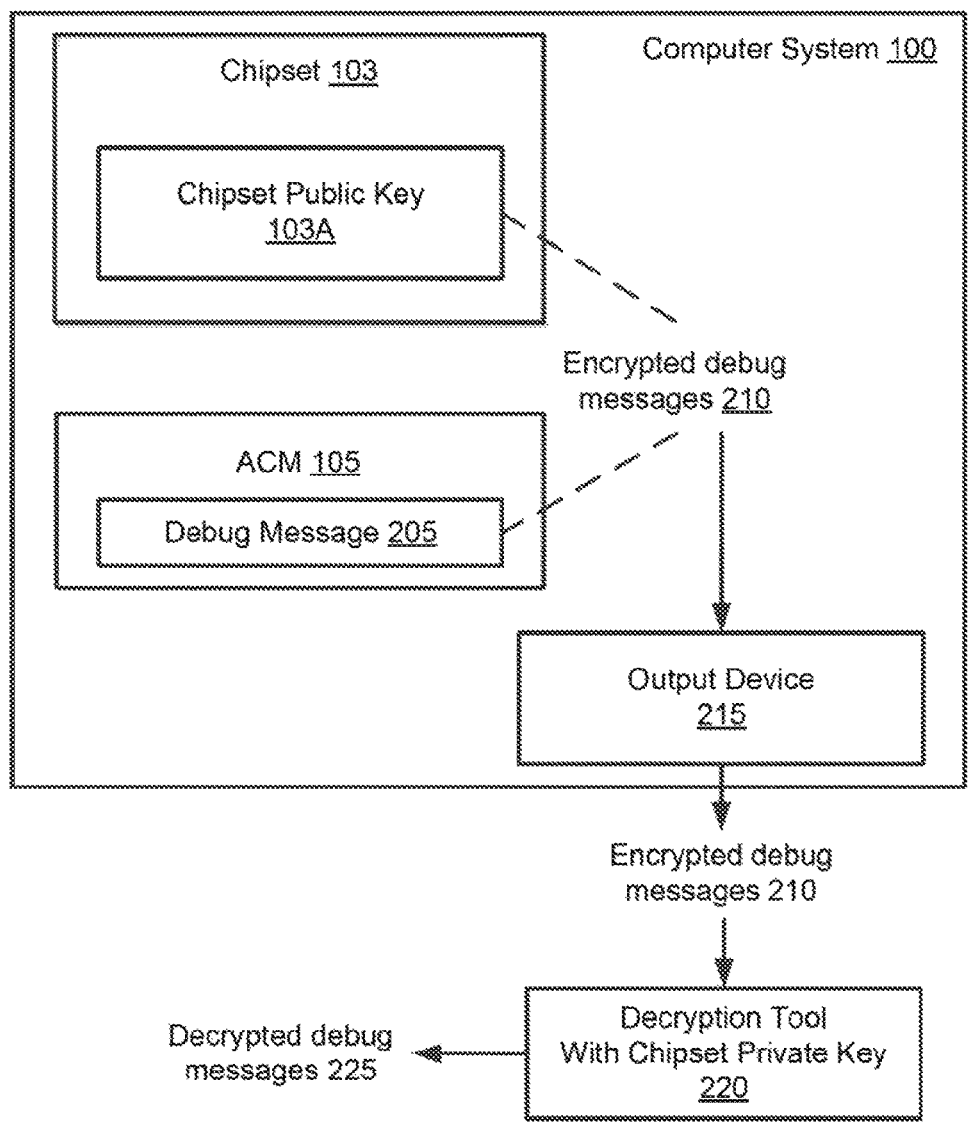
FIG. 2 is a block diagram that illustrates components used to secure the debug messages, according to an embodiment.

Turning now to FIG. 2, one embodiment of a computer system that may be used to enable securely outputting the debug messages. The computer system 100 may include the chipset 103 having chipset public key 103A. The computer system 100 further includes an ACM 105 which may be capable of generating debug messages 205. For some embodiments, the debug messages 205 may be encrypted using the chipset public key 103A to generate the encrypted debug message 210. The encrypted debug messages 210 may then be sent to an output device or an output port 215 of the computer system 100 so that the encrypted debug messages 210 may be accessed. It should be noted that at this point the debug messages may be secured. To read the encrypted debug messages 210, a user may need to access a decryption tool 220. This decryption tool 220 may be confidential and may only be accessed by a user who is authorized. For example, this may require the user to register and login with a user identification and password. The decryption tool may be an application on a secured server computer system, a webpage associated with a secured website, etc. The description tool 220 may read the encrypted debug messages and generate decrypted debug messages 225.

Figure 3:
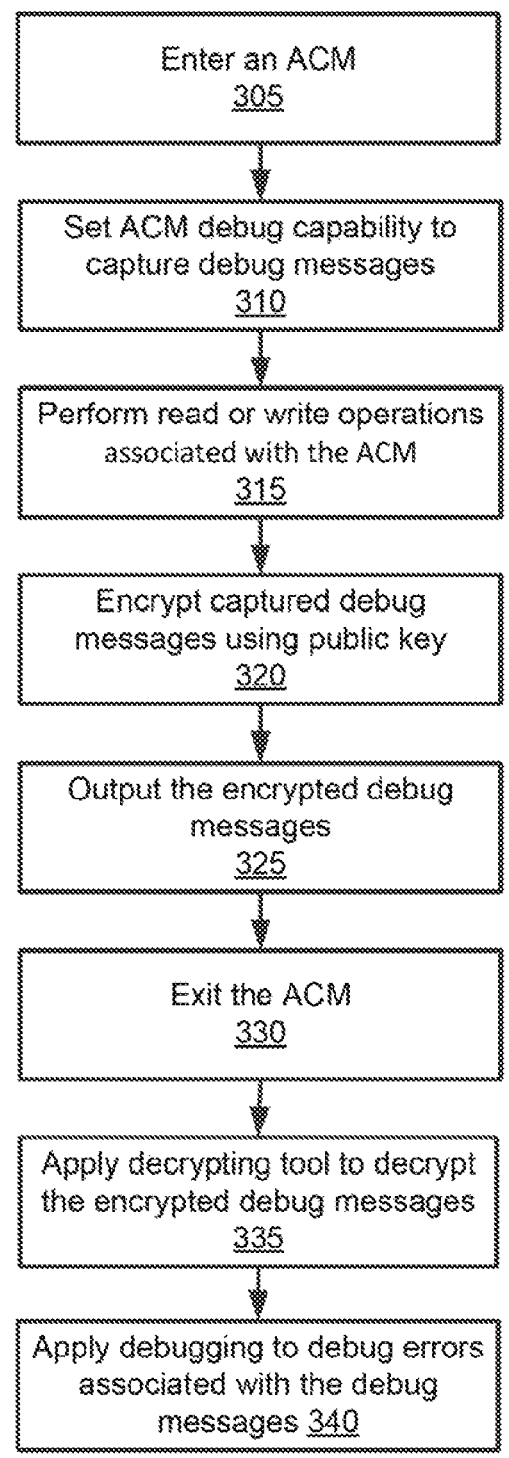
FIG. 3 is a flowchart of an example of a method of securely providing debug messages associated with an ACM, according to an embodiment.

Turning now to FIG. 3, a method of securely providing debug messages associated with an ACM is shown. The method may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), CMOS or transistor-transistor logic (TTL) technology, or any combination thereof. For example, computer program code to carry out operations shown in the method may be written in any combination of one or more programming languages, including an object oriented programming language such as C++ or the like and conventional procedural programming languages, such as the "C" programming language or similar programming languages.

Processing block 305 provides for entering an ACM. This may include executing instructions associated with the ACM. Block 310 may involve setting an ACM debug mode on. The functionality of block 310 may be set automatically, or it may be set by a user when it may be desirable to receive the debug messages associated with the operations of the ACM. Block 315 may involve performing some operations that may include reading and/or writing into hardware registers. During the operations of block 315, debug messages may be captured and stored, wherein the debug messages can be stored in a secured location. Block 320 may involve encrypting the captured debug messages using a public key. For some embodiments, the public key may be associated with a chipset of the computer system having a processor executing instructions associated with the ACM. Block 325 may involve outputting the encrypted debug messages to an output port of the computer system. The encrypted debug messages may be stored in a file. Block 330 may involve exiting the ACM.

Block 335 may involve applying a confidential tool to decrypt the encrypted debug messages. The confidential tool may include a private key that corresponds to the public key used to encrypt the debug messages. For some embodiments, the private key may be associated with the chipset. Block 340 may involve using the debug messages to determine or isolate any potential errors associated with the instructions included in the ACM and/or the hardware associated with the ACM. For some embodiments, the method described in FIG. 3 may be used to perform remote debugging of security related technology in production systems while safeguarding confidential information about the internal workings of the security software. In general, the method may be used to output debug information or messages securely. More specifically, the method may be used to perform efficient remote debugging of OEM Trusted Execution Technology (TXT) issues and solving integration issues timely. One example is the Intel® Trusted Execution Technology (Intel® TXT). An overview of the Intel TXT may be found in the "Intel® Trusted Execution Technology Architectural Overview" (Intel Corporation, 2003).

In some situations, the ACM 105 may be implemented in a Basic Input Output System (BIOS) (referred to as BIOS ACM). In these situations, the size of the ACM 105 may be of critical concern because the BIOS ACM may need to reside in the boot block area of the BIOS. For example, it may not be preferable when the size of the BIOS ACM is larger than 32 KB. This may be too restrictive because there may be functional extensions to the BIOS ACMs that may require large increases in the size of the BIOS ACMs making it larger than 32 KB. Some examples of these functional extensions may include debug messages, Universal Serial Bus (USB, e.g., USB Specification 3.0, Rev. 1.0, Nov. 12, 2008, USB Implementers Forum) debug port support, secure flash support, memory reference margining and data gathering routines, etc. Currently, there is no extension capability in the BIOS ACMs. All functionalities may be supported in the BIOS ACM itself, which in some cases can prevent functionalities from being added.

For some embodiments, the functionality of the BIOS ACM may be securely extended via dynamic downloading of new functionalities into the ACM. The new functionality may be referred to herein as an ACM extension module. Extending the functionality of the BIOS ACM may involve reading from non-boot block BIOS regions or downloading from input ports such as, for example, serial or USB debug ports. For some embodiments, the ACM extension module may be configured similarly to the ACMs (as described in FIG. 1B). It may be possible that the ACM extension modules may be developed by the same entity that develops the ACMs since that may be the entity that signs the ACM with its public key. For example, the entity may be Intel Corporation and the ACM extension modules may be signed using the Intel's chipset public key.

For some embodiments, the header 130 of the ACM extension module may be modified, and a new Firmware Interface Table (FIT) type that describes the ACM extension module may be used. The FIT contains starting addresses and sizes for the firmware components that may be outside the protected boot block. An overview of the FIT entry specification may be found in the "Itanium Processor Family System Abstraction Layer Specification", Document Number: 245359-005 (Intel Corporation, July 2001). The header 130 may include information that describes the functionality of the ACM extension module. The FIT types may be used to describe the ACM extension modules to be used. Further, the ACM code may need to be changed to load, authenticate, and execute the ACM extension modules. In addition, there may be a protocol used to download the ACM extension modules so that the computer system that hosts the ACM knows which ACM extension modules to load.

Figures 4A, 4B, 4C:
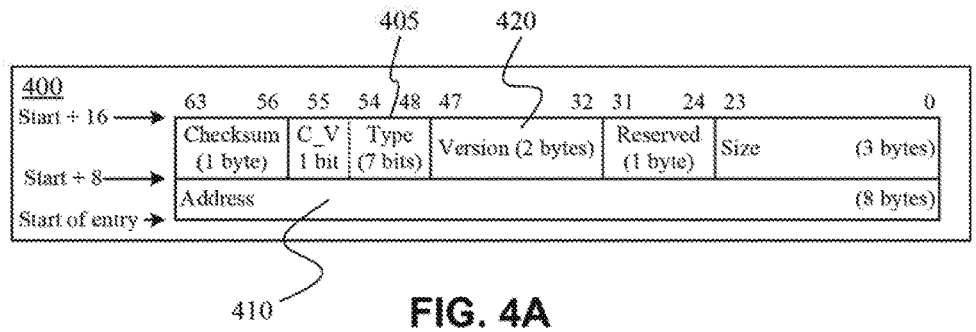
FIGS. 4A-4C are diagrams that illustrate information about an example Firmware Interface Table (FIT), according to an embodiment.

Turning to FIG. 4A, an example format of an FIT entry is shown. The FIT may contain multiple entries, with each entry containing information for the corresponding firmware component. A FIT entry may be 16 bytes long. The first two entries may be used to describe the FIT. Not all of the FIT entries in the FIT may be used. It may be noted that the FIT entry includes a "Type" field 405 which is 7 bits long and extends from the bit 48 to the bit 54 of the last 8 bytes of the FIT entry. It may also be noted that the FIT entry 400 includes an "Address" field 410 which may occupy the first 8 bytes of the FIT entry 400. FIG. 4B includes an example table showing various possible values for the "Type" field 405. The "Type" field 405 may be used to indicate what the corresponding firmware component may be used for (e.g., as an ACM extension module).

FIG. 4C includes a table showing an example format of an FIT entry that may be used to represent an ACM extension record. It may be noted that the format of the FIT entry of FIG. 4C may be almost identical to the format of the FIT entry of FIG. 4A. The FIT may include zero or more entries with an active or used entry corresponding to an ACM extension module. These entries may be referred to as ACM extension records, and they may be used for both debug and production signed ACMs depending on the type of functionality represented in the "EXT Type" field 420 of the ACM extension record. For some embodiments, an ACM extension record may be assigned a value of 0002D in hexadecimal in the "Type" field 405. This value of 0002D in hexadecimal falls within the OEM-defined values 410 from 0x10 to 0x7E in hexadecimal as illustrated in FIG. 4B. For some embodiments, each ACM extension record that has a type 0002D may be used to represent an address that may be accessible by the processor 101 of the computer system 100 at a reset vector. The address field 410 may contain the ACM extension structure. This ACM extension structure may contain information required to load and execute the ACM extension module.

Figure 5:
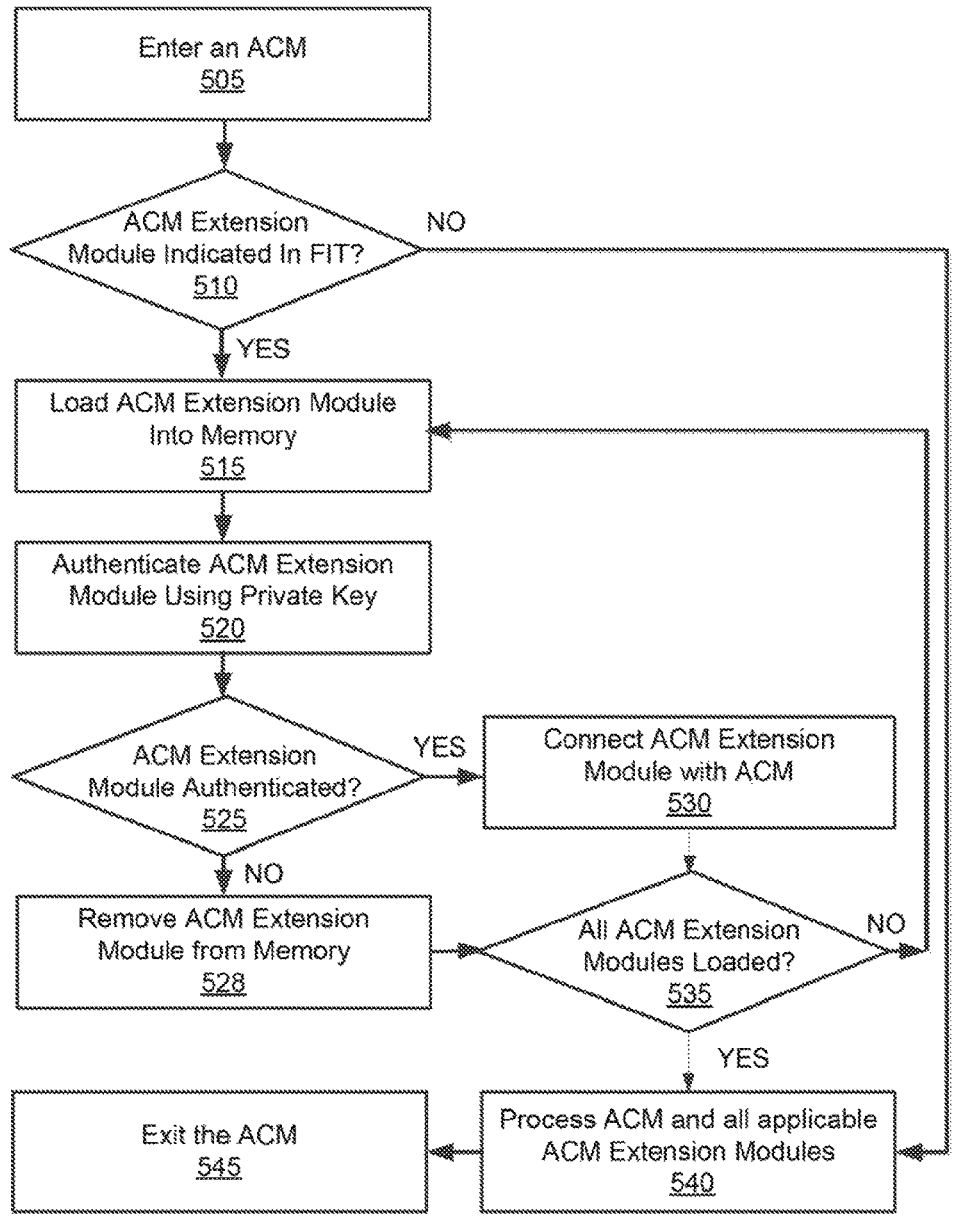
FIG. 5 is a flowchart of an example of a method of securely extending the functionalities of ACMs using ACM extension modules, according to an embodiment.

The "EXT Type" field 420 may define the functionality of the ACM extension module and may indicate what the ACM should do with the ACM extension module after the ACM extension module is verified for the proper signature authentication. This may include, for example, linking the ACM extension module into the execution of the ACM, executing the ACM extension module immediately, replacing the existing ACM with the ACM extension module, etc. Some example values for the "EXT Type" field 420 include:
- 0: USB debug
- 1: Debug messages
- 2: secure flash
- 3: other The "Load Method" field 425 may be used to define how the ACM extension module is to be loaded into a portion of the memory 102 (e.g., cache random access memory or CRAM). Some example values for the "Load Method" field 425 include:
- 0: Load from Memory (the "Address" field 410 specifies the address to load).
- 1: Load from a serial port
- 2: Load from a USB port Turning now to FIG. 5, a method of securely extending the functionalities of ACMs using ACM extension modules is shown. The method may be implemented as a set of logic instructions stored in a machine- or computer-readable storage medium such RAM, ROM, PROM, flash memory, etc., in configurable logic such as PLAs, FPGAs, CPLDs, in fixed-functionality logic hardware using circuit technology such as ASIC, CMOS or TTL technology, or any combination thereof. For example, computer program code to carry out operations shown in the method may be written in any combination of one or more programming languages, including an object oriented programming language such as C++ or the like and conventional procedural programming languages, such as the "C" programming language or similar programming languages.

Block 505 provides for entering an ACM. At block 510, a test may be performed to determine whether there is an ACM extension module to be considered. This may include checking the "Type" field 405 of an ACM extension record to determine if that field has a value that corresponds to an existence of an ACM extension module. Using the example mentioned above, the value of 0002D in hexadecimal indicates that there may be an ACM extension module to be considered. From the block 510, based on there is no ACM extension module, the process may flow to block 540 where the ACM may be processed. However, from the block 510, based on there is an ACM extension module, the process may flow to block 515 where the ACM extension module may be loaded into memory (e.g., CRAM). The loading of the ACM extension module may be dependent on where the ACM extension module exists. This may be based on the value of the "Load method" field 425.

At block 520, the ACM extension module may be authenticated. This may be performed using a private key. It should be noted that the ACM extension module has been digitally signed using a public key. The authentication of the ACM extension module may be performed with a private key that corresponds to that public key. For example, the ACM extension module may have been developed by Intel Corporation and digitally signed using an Intel chipset public key. As such, the authentication performed in block 520 may be to be with an Intel chipset private key. At block 525, a test may be performed to determine whether the ACM extension module is successfully authenticated. If the authentication is successful, the process may flow from block 525 to block 530 where the ACM extension module may be connected or hooked to the ACM. The connection of the ACM extension module to the ACM may be performed at pre-defined extension-specific location. For example, null pointers may be positioned at the pre-defined specific location of the ACM. When the ACM extension module is authenticated, the null pointers may be replaced with the pointers that point to the locations of the ACM extension modules. However, from block 525, if the authentication of the ACM extension module is not successful, the process may flow to block 528 where the ACM extension module may be removed. In this situation, the null pointers corresponding to the ACM extension module may not be replaced. From block 528 or block 530, the process may then flow to block 535.

At block 535, a test may be performed to determine whether all of the ACM extension modules have been processed. If there are more to be processed, the process may flow from block 535 to block 515 where the next ACM extension module may be loaded. However, if there is no more ACM extension module to be processed, the process may flow to block 540 where the ACM and all of the authenticated ACM extension modules may be processed. When the ACM extension module is not present (e.g., due to failing the authentication), the NULL pointers may be ignored.

At block 545, operations to exit the ACM may be performed. The method of FIG. 5 may enable adding functionalities to the ACM while reducing boot block footprint of the ACM. For example, for OEM enabling, debug functionality may be added to enable the debug messages. This may help performing remote debugging of OEM integration issues. As another example, USB debug port may be enabled without impacting the boot block footprint of the ACM. This may enable a secure functionality that may allow a service department to securely unlock a system that has been attacked by unauthorized sources. Secure flash may also be enabled using the ACM extension module.

Returning to the discussions about obtaining the debug messages mentioned above, one technique used to enhance firmware and BIOS debugging is to output the trace or debug data for all hardware registers accesses. This technique may allow remote debugging of issues. Hardware accesses may be conducted using a macro which may be written in C language or assembly code to perform the following operations:

Push the line number in the code where the hardware access occurs.
Push the filename of the code doing the hardware access,
Call the routine that does the hardware access and prints the trace or debug messages.
Perform the above operations without perturbing the processor state.

Following are the instructions in an example macro (referred to as a first macro for ease of identification) that may be inserted in the ASM code following every 32 bit reads. This first macro may be used to perform a 32 bit read of a memory location:

```
READ_32_DBG_MSG MACRO file:REQ,
lineNum:REQ, data:REQ, addr:REQ
.ERRIDNI <addr>, <dest>
IFDEF LT_TRACE
    pushad
    pushfd
    push   DWORD PTR data
    ; if register, push directly
    push   DWORD PTR addr
    push   DWORD PTR lineNum
    push   offset file
IFDEF LTSX_BIOSAC
    movzx eax, localSocketNum
```

-continued

```
        push    eax
        popSize = 6*sizeof(DWORD)
    ELSE
        popSize = 5*sizeof(DWORD)
    ENDIF
        push    offset memRead32FormatStr
        ;printf ("SKT #%d%s#%d MEMRD:%08x=>%08\n",
        localSocketNum,file,
                lineNum, addr, data );
        call    printf
        inc     esp, popSize
        popfd
        popad
    ENDIF
ENDM
```

A typical use of the above example macro may be as follows:

```
    mov  esi, LT_PRV_BASE + TXT.LT_SPAD_HIGH
    mov  eax, dword ptr ds:[esi]
    READ_32_DBG_MSG biosac_filename, @Line, eax, ds:[esi]
``` where @Line is a predefined macro that provides a line number of the code, and where biosac_filename is a name of the source code file (e.g., biosac.asm).

The message that gets printed after executing the above code may look like:

SKT 1, biosac.asm#1311 MEMRD: FED200A4=>00000000

The size of the first macro may impact the size of the associated ACM. For example, each register read may require the above macro to be added to the ACM which may increase the size of the ACM code. A large part of the complexity of the first macro may be due to the need to get a meaningful line number and filename. This may require pushing the line number and the filename inline in the original source file, before calling a routine to perform the rest of the operations.

For some embodiments, the debug message output may be altered to output the instruction pointer (IP) register at the time the call to a routine may be made. Post processing may then be used to compute the line numbers and the filenames for each access. Following is an example macro (referred to as a second macro for ease of identification) that may be used to perform these operations. In this second macro, the debug messages print IP from the call. Then a post-processing tool may use the build output files to convert the IP to a line number and the filename. Following are the example instructions in the second macro that may be used to perform a 32 bit read a memory location.

```
READ-32-DBG-MSG MACRO file:REQ, lineNum:REQ, data:REQ,
addr:REQ
.ERRIDNI <addr>, <dest>
IF DEF LT_TRACE
    push    DWORD PTR data
    ; if register, then push directly
    push    DWORD PTR addr
    call    Read32DebugMessage
ENDM
Read32DebugMessage PROC data:DWORD, addr:DWORD
    pushad
    pushfd
    push    DWORD PTR data
    ; if register, then push directly
    push    DWORD PTR addr
    ; Calculate src_address by getting return address from the
    stack and subtracting
    push    src_address
IF DEF LTSX BIOSAC
    movzx   eax, locaiSocketNum
    push    eax
    popSize = 6*sizeof(DWORD)
ELSE
    popSize = 5*sizeof(DWORD)
ENDIF
    ; memRead32FormatStr: "SKT #%d,
    EIP=%d   MEMRD:%08x=>%08\n",
    localSocketNum, src_address, addr, data);"
    push    offset memRead32FormatStr
    call    printf
    inc     esp, popSize
    popfd
    popad
```

The second macro and the approach described may optimize the code size while enabling the debug messages capability. Tools may be used to build the files and save the debug messages for processing. The tools may post process the debug messages into a file with the line numbers and the filenames for each hardware access.

Figure 6:
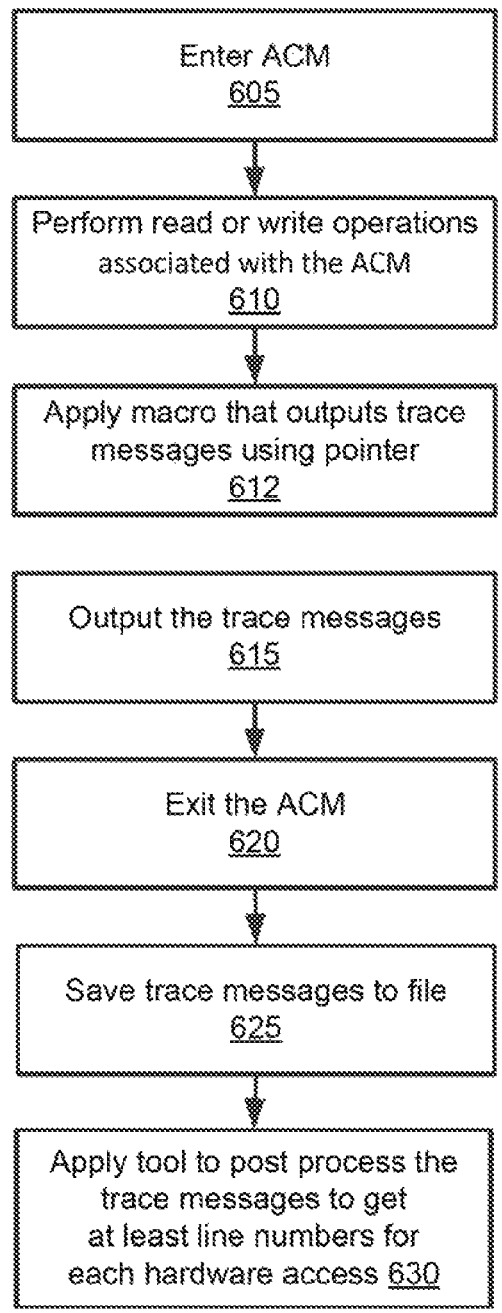
FIG. 6 is a flowchart of an example of a method of enabling debug messages with minimal impact on the size of code of the ACM by using information associated with an instruction pointer, according to an embodiment.

Turning now to FIG. 6, a method of enabling debug messages with minimal impact on the size of code of the ACM by using information associated with an instruction pointer is shown. The method corresponds to the technique described above in the second macro. The method may be implemented as a set of logic instructions stored in a machine- or computer-readable storage medium such as RAM, ROM, PROM, flash memory, etc., in configurable logic such as PLAs, FPGAs, CPLDs) in fixed-functionality logic hardware using circuit technology such as ASIC, CMOS or TTL technology, or any combination thereof. For example, computer program code to carry out operations shown in the method may be written in any combination of one or more programming languages, including an object oriented programming language such as C++ or the like and conventional procedural programming languages, such as the "C" programming language or similar programming languages.

Block 600 provides for using a macro that outputs debug messages using an instruction pointer (IP). Block 610 provides for entering an ACM. At block 610, operations may be performed to trigger the debug messages. These operations may include reading and writing to the hardware registers. At block 615, the debug messages may be output. Information related to the instruction pointer may also be output. This information may be used later to determine line number information and file name information associated with a code that includes an instruction used with the instruction pointer. Block 620 provides for exiting the ACM. At block 625, the debug messages may be saved to a file. At block 630, a tool may be used to process the debug messages to generate the line number of the code and the file name that contains the code where hardware accesses may occur.

Embodiments of the present invention may be applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer-implemented method comprising:
   defining an authenticated code module (ACM) extension module, implemented at least partly in one or more of configurable logic or fixed functionality logic hardware, using an entry of a Firmware Interface Table (FIT) that contains a starting address of the ACM extension module, wherein the starting address is located outside of a protected boot block to enable secure output of debug messages and limit an amount of information potentially revealed about the ACM; and
   extending a capability of an authenticated code module (ACM) by using the ACM extension module while reducing a boot block footprint of the ACM.

2. The method of claim 1, wherein the ACM extension module is defined by assigning a predefined value to a first field of the entry of the FIT, wherein the predefined value in the first field is used to determine if the ACM extension module for the ACM is to be loaded.

3. The method of claim 2, wherein the ACM extension module is loaded based on a predefined value assigned to a second field of the FIT, wherein the second field is configured to indicate one loading option from a group of loading options containing loading from a memory, loading from a serial port, and loading from a universal serial bus (USB) port.

4. The method of claim 3, wherein the ACM extension module is digitally signed using a public key associated with an entity that is also associated with the ACM.

5. The method of claim 4, wherein the ACM extension module is authenticated using a private key associated with the entity prior to the ACM extension module being connected with the ACM.

6. The method of claim 5, wherein the ACM extension module is connected with the ACM at a predefined connection point in the ACM, wherein a null pointer is used at the predefined connection point, and wherein the null pointer is replaced by a reference to the ACM extension module based on the ACM extension module having been authenticated.

7. The method of claim 6, wherein the extending the capability of the ACM by using the ACM extension module is performed by processing the ACM together with the connected ACM extension module.

8. The method of claim 7, wherein the first field is configured to occupy seven bits of a fourteenth byte of the entry of the FIT, wherein the second field is configured to occupy an eleventh byte of the entry of the FIT, and wherein the starting address of the ACM extension module is configured to occupy a first eight bytes of the entry of the FIT.

9. A non-transitory computer readable storage medium comprising a set of instructions which, when executed by a processor, cause a computer to:
   define an authenticated code module (ACM) extension module, implemented at least partly in one or more of configurable logic or fixed functionality logic hardware, using an entry of a Firmware Interface Table (FIT) that contain a starting address of the ACM extension module that is located outside of a protected boot block to enable secure output of debug messages and limit an amount of information potentially revealed about the ACM; and
   extend a capability of an authenticated code module (ACM) by using the ACM extension module while reducing a boot block footprint of the ACM.

10. The nom-transitory computer readable storage medium of claim 9, wherein the ACM extension module is defined by assigning a predefined value to a first field of the entry of the FIT, wherein the predefined value in the first field is to be used to determine whether the ACM extension module for the ACM is to be loaded.

11. The non-transitory computer readable storage medium of claim 10, wherein the ACM extension module is to be loaded based on a predefined value assigned to a second field of the FIT, wherein the second field is configured to indicate one loading option from a group containing loading from a memory, loading from a serial port, and loading from a universal serial bus (USB) port.

12. The non-transitory computer readable storage medium of claim 11, wherein the ACM extension module is to be digitally signed using a public key associated with an entity that is also associated with the ACM.

13. The non-transitory computer readable storage medium of claim 12, wherein the ACM extension module is to be authenticated using a private key associated with the entity prior to the ACM extension module being connected with the ACM at a predefined location in the ACM.

14. The non-transitory computer readable storage medium of claim 13, wherein the first field is configured to occupy seven bits of a fourteenth byte of the entry of the FIT, wherein the second field is configured to occupy an eleventh byte of the entry of the FIT, and wherein the starting address of the ACM extension module is configured to occupy a first eight bytes of the entry of the FIT.

15. A non-transitory computer readable storage medium comprising a set of instructions which, when executed by a processor, cause a computer to:
    enable debugging of an authenticated code module (ACM), implemented at least partly in one or more of configurable logic or fixed functionality logic hardware, using codes that cause information related to an instruction pointer associated with a processor to be presented along with debug messages to minimize an impact on the size of code associated with the ACM; and
    process the information related to the instruction pointer to determine line number information and file name information associated with a code that includes an instruction used with the instruction pointer.

16. The nom-transitory computer readable storage medium of claim 15, wherein the codes that cause the information related to the instruction pointer to be presented are to be included in a macro that is inserted into an execution stream associated with the ACM.

17. The non-transitory computer readable storage medium of claim 16, wherein the macro is to be configured to cause the information related to the instructions pointer to be presented instead of the line number information to be presented.

18. The non-transitory computer readable storage medium of claim 16, wherein the line number information is to indicate a line of a code that accesses a hardware component and the file name information indicates a filename of the code accessing the hardware component.

* * * * *